(12) United States Patent
Hari Krishna et al.

(10) Patent No.: US 11,902,301 B2
(45) Date of Patent: Feb. 13, 2024

(54) SYSTEM AND METHOD FOR IMPLEMENTING AN AUTO DETECT, FIX AND DEPLOY MODULE

(71) Applicant: JPMorgan Chase Bank, N.A., New York, NY (US)

(72) Inventors: Varigonda Hari Krishna, Nellore (IN); Gagan Leekha, Bangalore (IN); Bandarupalli Nagarjuna, Chittoor (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 350 days.

(21) Appl. No.: 17/446,527

(22) Filed: Aug. 31, 2021

(65) Prior Publication Data

US 2023/0028866 A1    Jan. 26, 2023

(30) Foreign Application Priority Data

Jul. 20, 2021   (IN) .............................. 202111032620

(51) Int. Cl.
*H04L 9/40*   (2022.01)
*G06F 16/93*   (2019.01)

(52) U.S. Cl.
CPC .......... *H04L 63/1416* (2013.01); *G06F 16/93* (2019.01)

(58) Field of Classification Search
CPC .................................................. H04L 63/1416
See application file for complete search history.

(56) References Cited

U.S. PATENT DOCUMENTS

| | | | | |
|---|---|---|---|---|
| 7,499,967 | B2* | 3/2009 | Hulse ...................... | H04L 67/30 709/246 |
| 7,509,398 | B2* | 3/2009 | Acharya .................. | H04L 67/02 709/219 |
| 2004/0045005 | A1* | 3/2004 | Karakashian ........... | H04L 69/12 719/310 |
| 2011/0161477 | A1* | 6/2011 | Kowalski ................ | H04L 69/08 709/223 |
| 2023/0028866 | A1* | 1/2023 | Hari Krishna .......... | H04L 69/40 |

* cited by examiner

*Primary Examiner* — Ponnoreay Pich
(74) *Attorney, Agent, or Firm* — GREENBLUM & BERNSTEIN, P.L.C.

(57) ABSTRACT

A system and method for automatically healing web service disruptions are disclosed. A processor establishes a communication link between a web service provider device in a web service provider side and a web service consuming device in a web service consuming side in a computer network environment. A receiver receives a request from the web service consuming device to receive a web service provided by the web service provider device. The processor detects a change in an XML document in the web service provider side which disrupts receiving the web service requested by the web service consuming device; generates stubs on the fly in response to detecting the change in the XML, document; implements the stubs that addresses the detected change in the XML document; and automatically heals web service disruptions in response to implementing the stubs.

20 Claims, 6 Drawing Sheets

SYSTEM AND METHOD FOR IMPLEMENTING AN AUTO DETECT, FIX AND DEPLOY MODULE

CROSS-REFERENCE TO RELATED APPLICATIONS

This application also claims the benefit of priority from Indian Provisional Patent Application No. 202111032620, filed Jul. 20, 2021, which is herein incorporated by reference in its entirety.

TECHNICAL FIELD

This disclosure generally relates to web services, and, more particularly, to methods and apparatuses for implementing an auto detect, fix, and deploy module that can heal issues with WSDL (Web Services Description Language) changes from consumer side automatically without any manual intervention.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

SOAP (Simple Object Access Protocol) is a messaging protocol specification configured for exchanging structured information in the implementation of web services in computer networks. SOAP's purpose may include providing extensibility, neutrality, verbosity and independence. However, when there are frequent changes being made in SOAP API Services in the provider side, consumer can experience disruptions in web services. Today, in order to address this issue, a manual intervention is required to create stubs with latest WSDL and raise Pull request and redeploy changes till production once changes are merged. This conventional manual process may prove to be very time consuming, e.g., utilizing a lot of man hours to do this job, and also disrupting web services for consumers until services are up, thereby adversely impacting services for consumers. Thus, these is a need for an automatic healing process to address this issue.

SUMMARY

The present disclosure, through one or more of its various aspects, embodiments, and/or specific features or sub-components, provides, among other features, various systems, servers, devices, methods, media, programs, and platforms for implementing an auto detect, fix, and deploy module that can heal issues with WSDL changes from consumer side automatically without any manual intervention, but the disclosure is not limited thereto.

According to an aspect of the present disclosure, a method for automatically healing web service disruptions by utilizing one or more processors and one or more memories is disclosed. The method may include: establishing a communication link between a web service provider device in a web service provider side and a web service consuming device in a web service consuming side in a computer network environment; receiving a request from the web service consuming device to receive a web service provided by the web service provider device; detecting a change in an XML document in the web service provider side which disrupts receiving the web service requested by the web service consuming device; generating stubs on the fly in response to detecting the change in the XML document; implementing the stubs that addresses the detected change in the XML document; and automatically healing web service disruptions in response to implementing the stubs.

According to another aspect of the present disclosure, the web service provider device may utilize both the XML (Extensible Markup Language) document that describes the web service and a predefined messaging protocol specification that exchanges structured information in implementation of the web service in the computer network environment, but the disclosure is not limited thereto.

According to yet another aspect of the present disclosure, the XML document may be a WSDL (Web Services Description Language) document that describes functions that can be implemented or exposed to the web service consuming device, but the disclosure is not limited thereto.

According to another aspect of the present disclosure, the predefined messaging protocol may be a SOAP (Simple Object Access Protocol) protocol which is an XML-based protocol configured for exchanging info over a particular protocol between applications, but the disclosure is not limited thereto.

According to a further aspect of the present disclosure, the particular protocol may include any one of the following protocol: IMAP (Internet Message Access Protocol), POP (Post Office Protocol 3) protocol; SMTP (Simple Mail Transfer Protocol), HTTP (Hyper Text Transfer Protocol), and FTP (File Transfer Protocol), but the disclosure is not limited thereto.

According to yet another aspect of the present disclosure, in generating the stubs on the fly, the method may further include: transmitting a notification to a SOAP service monitor that a change in the WSDL is detected by the web service consuming device; invoking, in response to receiving the notification, an auto build application programming interface (API) with WSDL which got changed, wherein the auto build API invokes an automation server and triggers the build; automatically generating the stubs in the automation server in response to triggering the build; and deploying the stubs onto a private cloud as a packaged file format.

According to an additional aspect of the present disclosure, the automation server may be configured to facilitate automating the parts of software development related to building, testing, and deploying, facilitating continuous integration and continuous delivery, but the disclosure is not limited thereto.

According to a further aspect of the present disclosure, the automation server may be Jenkins and the packaged file format may be a Java archive (JAR) file format. The JAR is a package file format typically used to aggregate many Java class files and associated metadata and resources into one file for distribution. JAR files are archive files that may include a Java-specific manifest file and typically have a .jar file extension.

According to another aspect of the present disclosure, a system for automatically healing web service disruptions is disclosed. The system may include: a processor; and a memory operatively connected to the processor via a communication interface, the memory storing computer readable instructions, when executed, causes the processor to: establish a communication link between a web service provider device in a web service provider side and a web service consuming device in a web service consuming side in a computer network environment; receive a request from the web service consuming device to receive a web service provided by the web service provider device; detect a change in an XML document in the web service provider side which disrupts receiving the web service requested by the web service consuming device; generate stubs on the fly in response to detecting the change in the XML document; implement the stubs that addresses the detected change in the XML document; and automatically heal web service disruptions in response to implementing the stubs.

According to a further aspect of the present disclosure, in generating the stubs on the fly, the processor may be further configured to: transmit a notification to a SOAP service monitor that a change in the WSDL is detected by the web service consuming device; invoke, in response to receiving the notification, an auto build application programming interface (API) with WSDL which got changed, wherein the auto build API invokes an automation server and triggers the build; automatically generate the stubs in the automation server in response to triggering the build; and deploy the stubs onto a private cloud as a packaged file format, wherein the automation server may be Jenkins and the packaged file format may be a Java archive (JAR) file format.

According to yet another aspect of the present disclosure, a non-transitory computer readable medium configured to store instructions for automatically healing web service disruptions is disclosed. The instructions, when executed, may cause a processor to perform the following: establishing a communication link between a web service provider device in a web service provider side and a web service consuming device in a web service consuming side in a computer network environment; receiving a request from the web service consuming device to receive a web service provided by the web service provider device; detecting a change in an XML document in the web service provider side which disrupts receiving the web service requested by the web service consuming device; generating stubs on the fly in response to detecting the change in the XML document; implementing the stubs that addresses the detected change in the XML document; and automatically healing web service disruptions in response to implementing the stubs.

According to yet another aspect of the present disclosure, in generating the stubs on the fly, the instructions, when executed, may cause the processor to further perform the following: transmitting a notification to a SOAP service monitor that a change in the WSDL is detected by the web service consuming device; invoking, in response to receiving the notification, an auto build application programming interface (API) with WSDL which got changed, wherein the auto build API invokes an automation server and triggers the build; automatically generating the stubs in the automation server in response to triggering the build; and deploying the stubs onto a private cloud as a packaged file format.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

Figure 1:
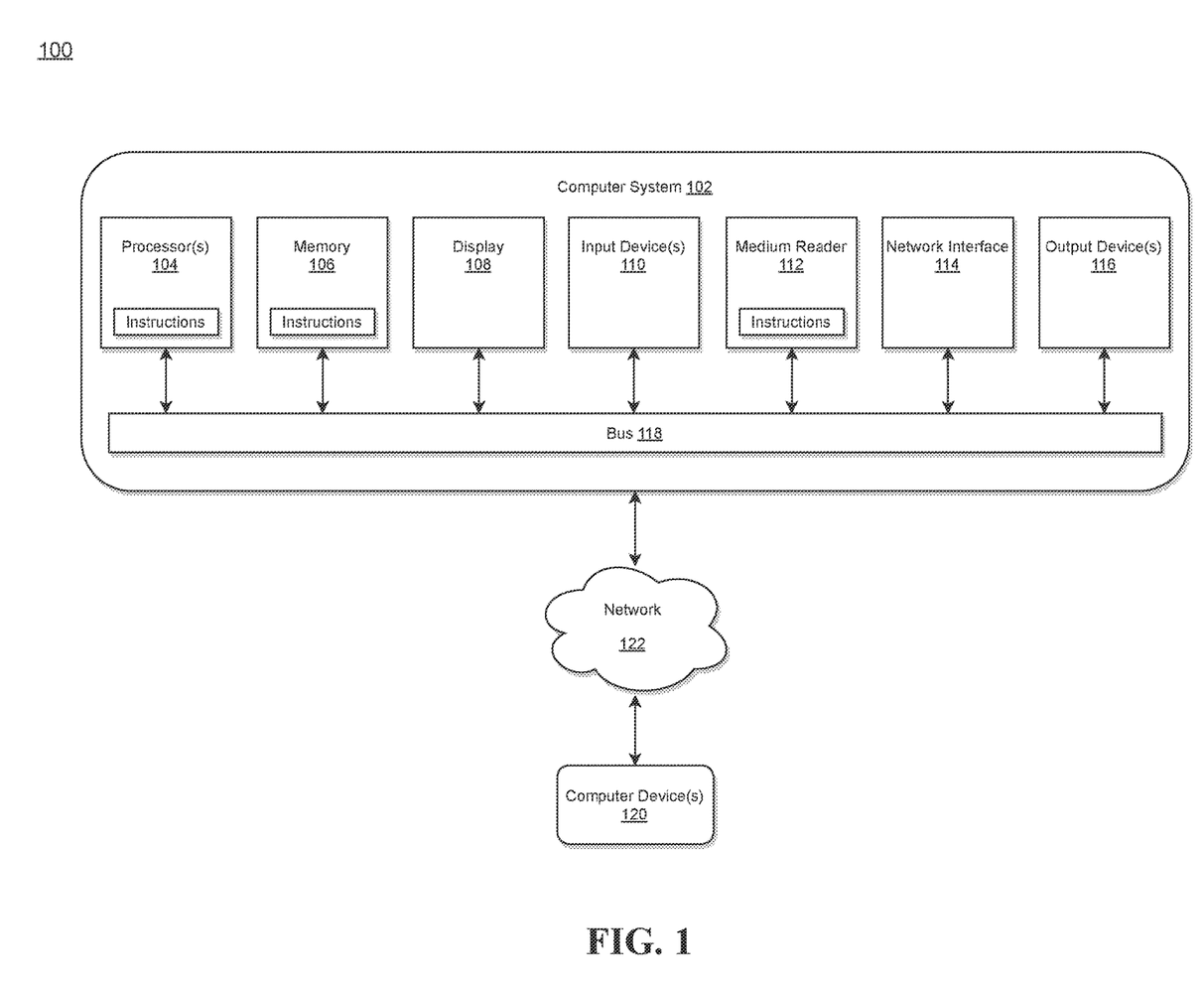
FIG. 1 illustrates a computer system for implementing an auto detect, fix, and deploy module for automatically healing web service disruptions in accordance with an exemplary embodiment.

FIG. 1 is an exemplary system for use in implementing an auto detect, fix, and deploy module for automatically healing web service disruptions in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
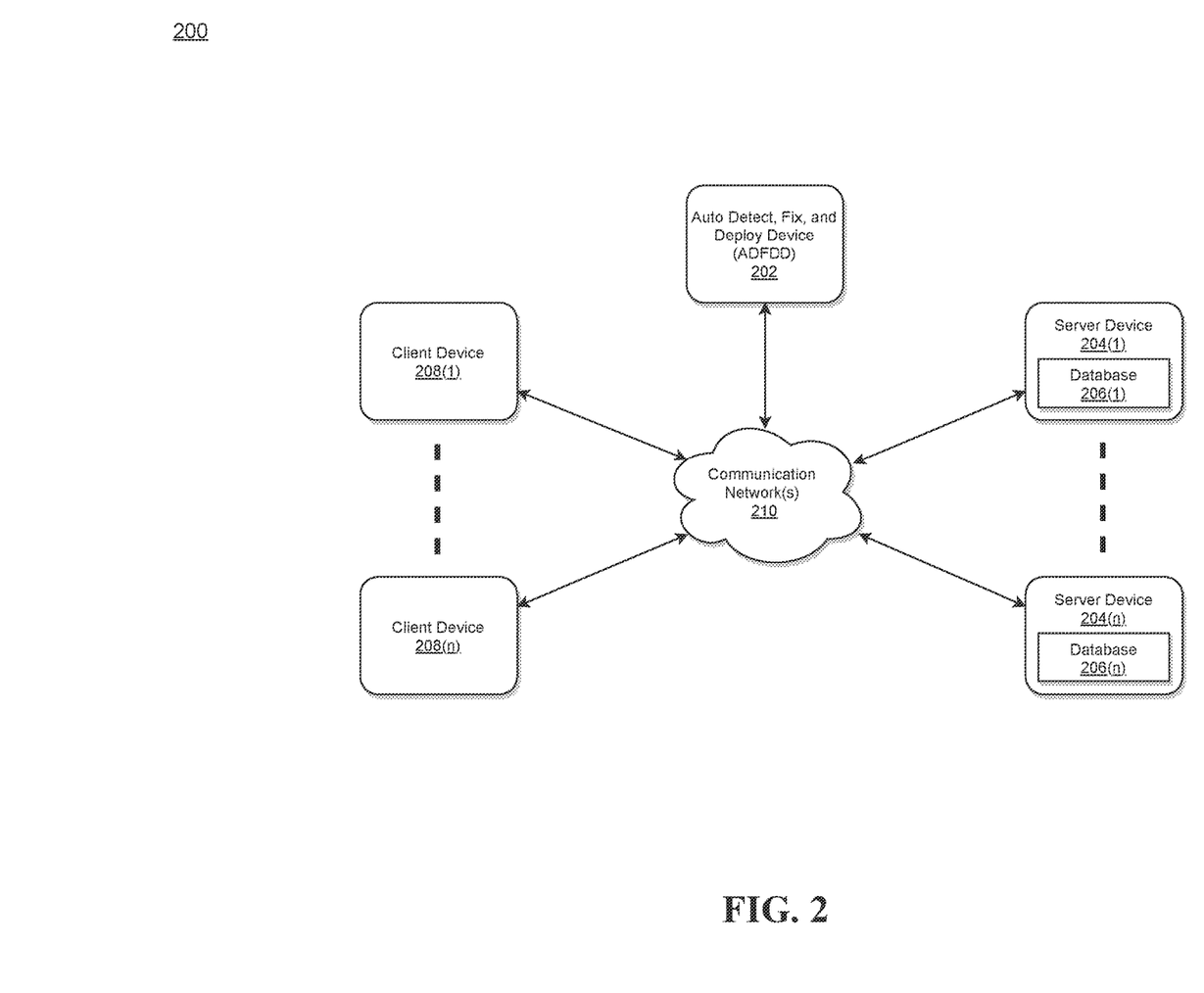
FIG. 2 illustrates an exemplary diagram of a network environment with an auto detect, fix, and deploy device in accordance with an exemplary embodiment.

Referring to FIG. 2, a schematic of an exemplary network environment 200 for implementing an auto detect, fix, and deploy device (ADFDD) for automatically healing web service disruptions of the instant disclosure is illustrated.

According to exemplary embodiments, the above-described problems associated with conventional approach may be overcome by implementing an ADFDD 202 as illustrated in FIG. 2 that may provide a platform for implementing an auto detect, fix, and deploy module that can heal issues with WSDL changes from consumer side automatically without any manual intervention, but the disclosure is not limited thereto.

The ADFDD 202 may be the same or similar to the computer system 102 as described with respect to FIG. 1.

The ADFDD 202 may store one or more applications that can include executable instructions that, when executed by the ADFDD 202, cause the ADFDD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ADFDD 202 itself, may be located in virtual server(s) running in a cloud-based computing environment rather than being tied to one or more specific physical network computing devices. Also, the application(s) may be running in one or more virtual machines (VMs) executing on the ADFDD 202. Additionally, in one or more embodiments of this technology, virtual machine(s) running on the ADFDD 202 may be managed or supervised by a hypervisor.

In the network environment 200 of FIG. 2, the ADFDD 202 is coupled to a plurality of server devices 204(1)-204(n) that hosts a plurality of databases 206(1)-206(n), and also to a plurality of client devices 208(1)-208(n) via communication network(s) 210. A communication interface of the ADFDD 202, such as the network interface 114 of the computer system 102 of FIG. 1, operatively couples and communicates between the ADFDD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ADFDD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ADFDD 202 may be a standalone device or integrated with one or more other devices or apparatuses, such as one or more of the server devices 204(1)-204(n), for example. In one particular example, the ADFDD 202 may be hosted by one of the server devices 204(1)-204(*n*), and other arrangements are also possible. Moreover, one or more of the devices of the ADFDD 202 may be in the same or a different communication network including one or more public, private, or cloud networks, for example.

The plurality of server devices 204(1)-204(*n*) may be the same or similar to the computer system 102 or the computer device 120 as described with respect to FIG. 1, including any features or combination of features described with respect thereto. For example, any of the server devices 204(1)-204(*n*) may include, among other features, one or more processors, a memory, and a communication interface, which are coupled together by a bus or other communication link, although other numbers and/or types of network devices may be used. The server devices 204(1)-204(*n*) in this example may process requests received from the ADFDD 202 via the communication network(s) 210 according to the HTTP-based and/or JavaScript Object Notation (JSON) protocol, for example, although other protocols may also be used. According to a further aspect of the present disclosure, wherein the user interface may be a Hypertext Transfer Protocol (HTTP) web interface, but the disclosure is not limited thereto.

The server devices 204(1)-204(*n*) may be hardware or software or may represent a system with multiple servers in a pool, which may include internal or external networks. The server devices 204(1)-204(*n*) hosts the databases 206(1)-206(*n*) that are configured to store metadata sets, data quality rules, and newly generated data.

Although the server devices 204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204(1)-204(*n*) may contain a plurality of network computing devices that operate using a master/slave approach, whereby one of the network computing devices of the server devices 204(1)-204(*n*) operates to manage and/or otherwise coordinate operations of the other network computing devices.

The server devices 204(1)-204(*n*) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(*n*) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(*n*) or other client devices 208(1)-208(*n*).

According to exemplary embodiments, the client devices 208(1)-208(*n*) in this example may include any type of computing device that can facilitate the implementation of the ADFDD 202 that may efficiently provide a platform for implementing an auto detect, fix, and deploy module that can heal issues with WSDL changes from consumer side automatically without any manual intervention, but the disclosure is not limited thereto.

The client devices 208(1)-208(*n*) may run interface applications, such as standard web browsers or standalone client applications, which may provide an interface to communicate with the ADFDD 202 via the communication network(s) 210 in order to communicate user requests. The client devices 208(1)-208(*n*) may further include, among other features, a display device, such as a display screen or touchscreen, and/or an input device, such as a keyboard, for example.

Although the exemplary network environment 200 with the ADFDD 202, the server devices 204(1)-204(*n*), the client devices 208(1)-208(*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ADFDD 202, the server devices 204(1)-204(*n*), or the client devices 208(1)-208(*n*), for example, may be configured to operate as virtual instances on the same physical machine. For example, one or more of the ADFDD 202, the server devices 204(1)-204(*n*), or the client devices 208(1)-208(*n*) may operate on the same physical device rather than as separate devices communicating through communication network(s) 210. Additionally, there may be more or fewer ADFDDs 202, server devices 204(1)-204(*n*), or client devices 208(1)-208(*n*) than illustrated in FIG. 2. According to exemplary embodiments, the ADFDD 202 may be configured to send code at run-time to remote server devices 204(1)-204(*n*), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
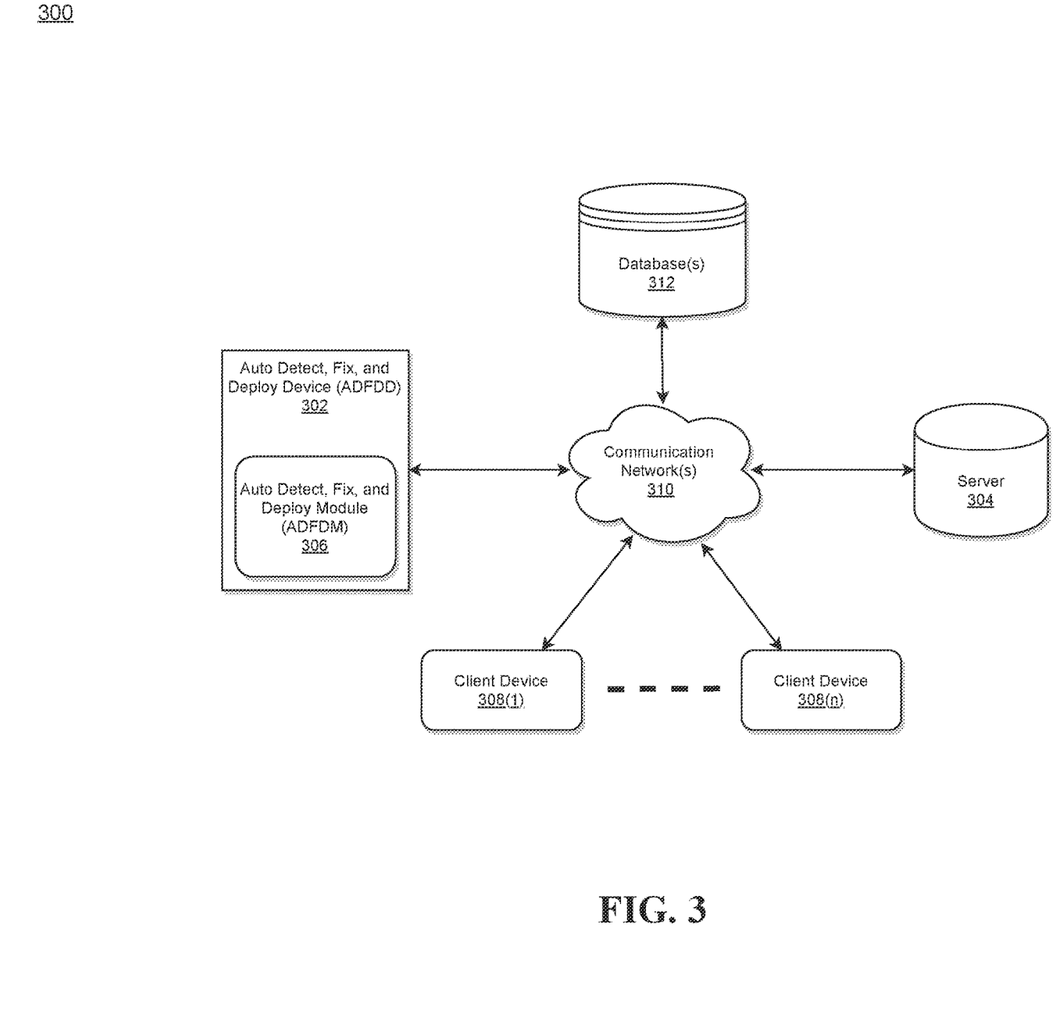
FIG. 3 illustrates a system diagram for implementing an auto detect, fix, and deploy device with an auto detect, fix, and deploy module in accordance with an exemplary embodiment.

FIG. 3 illustrates a system diagram for implementing an ADFDD having an auto detect, fix, and deploy module (ADFDM) that can heal issues with WSDL changes from consumer side automatically without any manual intervention in accordance with an exemplary embodiment.

As illustrated in FIG. 3, the system 300 may include an ADFDD 302 within which an ADFDM 306 is embedded, a server 304, a database(s) 312, a plurality of client devices 308(1) . . . 308(*n*), and a communication network 310.

According to exemplary embodiments, the ADFDD 302 including the ADFDM 306 may be connected to the server 304, and the database(s) 312 via the communication network 310. Although there is only one database has been illustrated, the disclosure is not limited thereto. Any number of databases may be utilized. The ADFDD 302 may also be connected to the plurality of client devices 308(1) . . . 308(*n*) via the communication network 310, but the disclosure is not limited thereto.

According to exemplary embodiment, the ADFDD 302 is described and shown in FIG. 3 as including the ADFDM 306, although it may include other rules, policies, modules, databases, or applications, for example. According to exemplary embodiments, the database(s) 312 may be embedded within the ADFDD 302. According to exemplary embodiments, the database(s) 312 may be configured to store configuration details data corresponding to a desired data to be fetched from one or more data sources, user information data etc., but the disclosure is not limited thereto.

According to exemplary embodiments, the ADFDM 306 may be configured to receive real-time feed of data from the plurality of client devices 308(1) . . . 308(n) via the communication network 310.

According to exemplary embodiments, as will be described below, the ADFDM 306 may be configured to establish a communication link between a web service provider device in a web service provider side and a web service consuming device in a web service consuming side in a computer network environment; receive a request from the web service consuming device to receive a web service provided by the web service provider device; detect a change in an XML document in the web service provider side which disrupts receiving the web service requested by the web service consuming device; generate stubs on the fly in response to detecting the change in the XML document; implement the stubs that addresses the detected change in the XML document; and automatically heal web service disruptions in response to implementing the stubs, but the disclosure is not limited thereto.

The plurality of client devices 308(1) . . . 308(n) are illustrated as being in communication with the ADFDD 302. In this regard, the plurality of client devices 308(1) . . . 308(n) may be "clients" of the ADFDD 302 and are described herein as such. Nevertheless, it is to be known and understood that the plurality of client devices 308(1) . . . 308(n) need not necessarily be "clients" of the ADFDD 302, or any entity described in association therewith herein. Any additional or alternative relationship may exist between either or both of the plurality of client devices 308(1) . . . 308(n) and the ADFDD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the ADFDD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The ADFDD 302 may be the same or similar to the ADFDD 202 as described with respect to FIG. 2, including any features or combination of features described with respect thereto.

Figure 4:
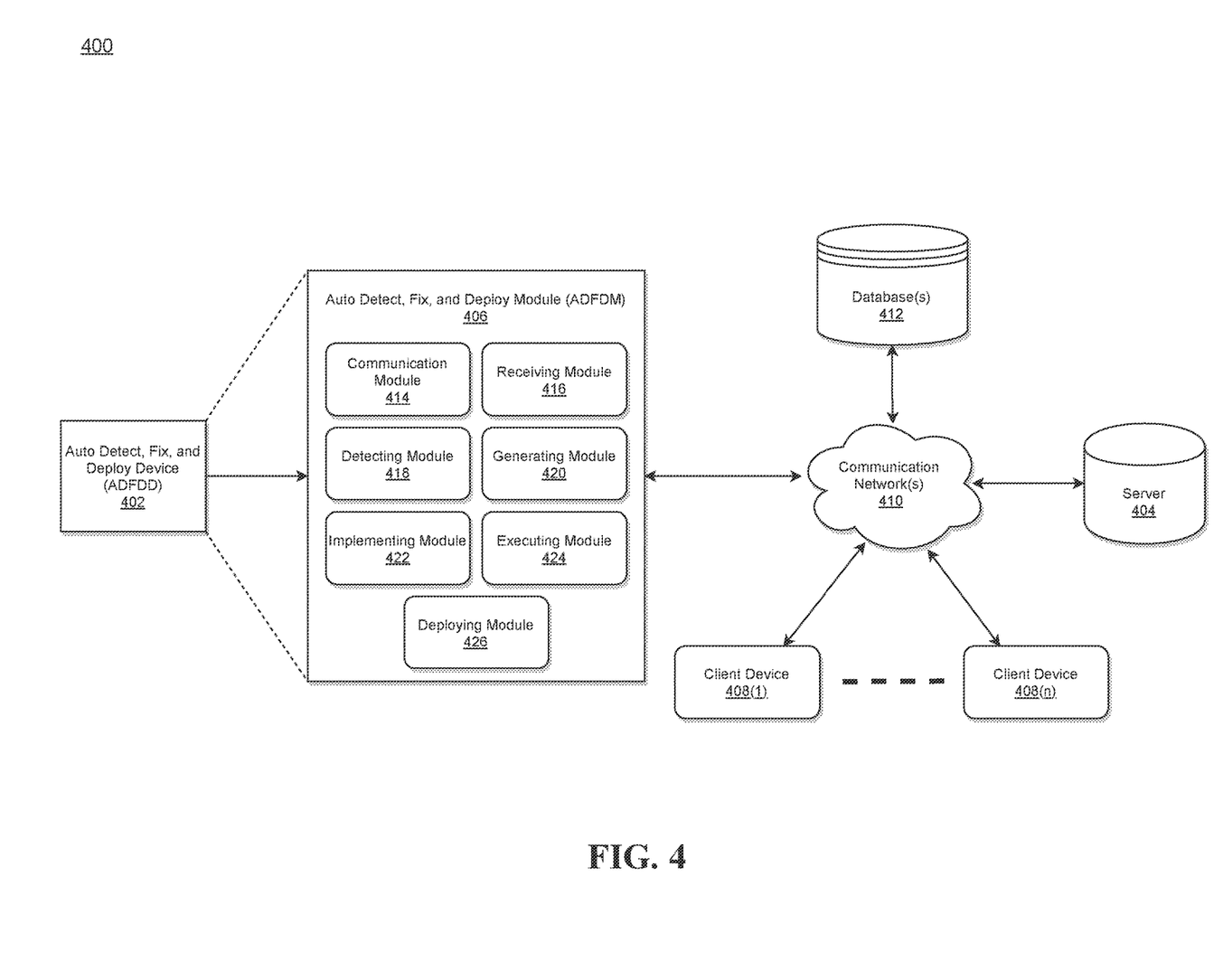
FIG. 4 illustrates a system diagram for implementing an auto detect, fix, and deploy module of FIG. 3 in accordance with an exemplary embodiment.

FIG. 4 illustrates a system diagram for implementing an auto detect, fix, and deploy module (ADFDM) of FIG. 3 that can heal issues with WSDL changes from consumer side automatically without any manual intervention in accordance with an exemplary embodiment.

According to exemplary embodiments, the system 400 may include an auto detect, fix, and deploy device (ADFDD) 402 within which an ADFDM 406 is embedded, a server 404, a database(s) 412, and a communication network 410.

According to exemplary embodiments, the ADFDD 402 including the ADFDM 406 may be connected to the server 404, and the database(s) 412 via the communication network 410. The ADFDD 402 may also be connected to the plurality of client devices 408(1) . . . 408(n) via the communication network 410, but the disclosure is not limited thereto. According to exemplary embodiments, the ADFDD 402, the ADFDM 406, the database(s) 412, the server 404, the client devices 408(1)-408(n), and the communication network 410 as illustrated in FIG. 4 may be the same or similar to the ADFDD 302, the ADFDM 306, the database(s) 312, the server 304, the client devices 308(1)-308(n), and the communication network 310, respectively, as illustrated in FIG. 3.

According to exemplary embodiments, as illustrated in FIG. 4, the ADFDM 406 may include a communication module 414, a receiving module 416, a detecting module 418, a generating module 420, an implementing module 422, an executing module 424, and a deploying module 426.

The process may be executed via the communication module 414 and the communication network 410, which may comprise plural networks as described above. For example, in an exemplary embodiment, the various components of the ADFDM 406 may communicate with the server 404, and the database(s) 412 via the communication module 414 and the communication network 410. Of course, these embodiments are merely exemplary and are not limiting or exhaustive.

According to exemplary embodiments, the communication network 410 and the communication module 414 may be configured to establish a link between the database(s) 412, the client devices 408(1)-408(n) and the ADFDM 406.

According to exemplary embodiments, each of the communication module 414, receiving module 416, detecting module 418, generating module 420, implementing module 422, executing module 424, and the deploying module 426 may be implemented by microprocessors or similar, they may be programmed using software (e.g., microcode) to perform various functions discussed herein and may optionally be driven by firmware and/or software. Alternatively, each of the communication module 414, receiving module 416, detecting module 418, generating module 420, implementing module 422, executing module 424, and the deploying module 426 may be implemented by dedicated hardware, or as a combination of dedicated hardware to perform some functions and a processor (e.g., one or more programmed microprocessors and associated circuitry) to perform other functions. Also, according to exemplary embodiments, each of the communication module 414, receiving module 416, detecting module 418, generating module 420, implementing module 422, executing module 424, and the deploying module 426 may be physically separated into two or more interacting and discrete blocks, units, devices, and/or modules without departing from the scope of the inventive concepts.

According to exemplary embodiments, each of the communication module 414, receiving module 416, detecting module 418, generating module 420, implementing module 422, executing module 424, and the deploying module 426 of the ADFDM 406 may be called by corresponding API, but the disclosure is not limited thereto.

Figure 5:
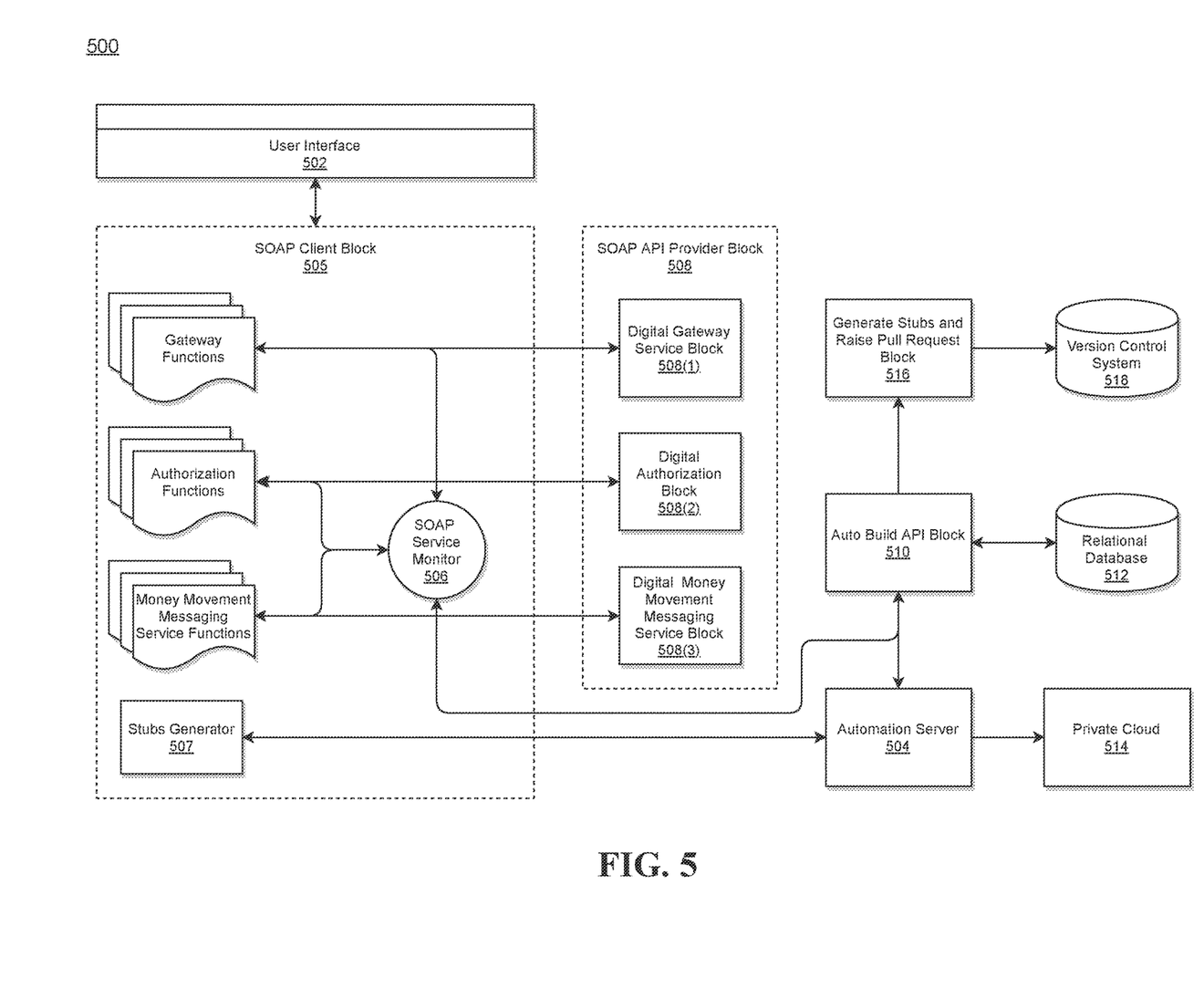
FIG. 5 illustrates an exemplary architecture diagram implemented by the auto detect, fix, and deploy module of FIG. 4 in accordance with an exemplary embodiment.

According to exemplary embodiments, FIG. 5 illustrates an exemplary architecture diagram 500 implemented by the ADFDM 406 of FIG. 4 in accordance with an exemplary embodiment. Although FIG. 5 illustrates utilizing a SOAP messaging protocol, the disclosure is not limited thereto. Any desired messaging protocol may be utilized without departing from the true spirit and scope of the present disclosure.

As illustrated in FIG. 5, the architecture diagram 500 may include a user interface 502, a SOAP client block 505, an automation server 504, a SOAP API provider block 508, an auto build API block 510, a relational database 512, a private cloud 514, a generate stubs and raise pull request block 516, and a version control system 518.

According to exemplary embodiments, the SOAP client block 505 may include a SOAP service monitor 506, and a stubs generator 507. The SOAP API provider block 508 may include a digital GWS (Gateway Service) block 508(1), a digital authorization block 508(2), and a digital MMS (Money Movement Messaging Service) block 508(3).

According to exemplary embodiments, the automation server 504 may be configured to facilitate automating the parts of software development related to building, testing, and deploying, facilitating continuous integration and continuous delivery, but the disclosure is not limited thereto. According to exemplary embodiments, the automation server may be Jenkins.

According to exemplary embodiments, the relational database 512 may be a Maria Database and the version control system 518 may be a GIT repository, but the disclosure is not limited thereto According to exemplary embodiments, the user interface 502 may be operatively connected to the SOAP client block 505. Gateway functions data may be obtained from the digital GWS block 508(1), authorization functions data may be obtained from the digital authorization block 508(2), and MMS functions data may be obtained from the digital MMS block 508(3). The SOAP service monitor 506 may utilize the gateway functions data, authorization functions data, and the MMS functions data to monitor changes in WSDL.

Referring to FIGS. 4-5, the ADFDM 406 may generate stubs on the fly whenever there is change in WSDL detected by client services. According to exemplary embodiments, a method stub or simply stub may refer to a piece of code (i.e., Java code) used to stand in for some other programming functionality. A stub, according to exemplary embodiments, may simulate the behavior of existing code or be a temporary substitute for yet-to-be-developed code.

For example, whenever consumer of soap services invoked and it came across exceptions due to change in WSDL from soap provider side, the SOAP service monitor 506 may be notified which in turn invokes the auto build API block 510 to invoke auto build API with WSDL which got changed. The auto build API block 510 then invokes the automation server 504 (i.e., Jenkins) and triggers the build which enables stubs generation in the problematic consumer and new stubs get generated in Jenkins workspace and the JAR gets deployed into the private cloud 514. Once stubs got generated successfully by the stubs generator 507, it may raise pull request in the generate stubs and raise pull request block 516 to destination branch as per configuration and may notify reviewers with mail (i.e., electronic mail). After deployment client APIs which were consuming SOAP services may heal automatically and the subsequent requests from client from UI 502 may work without any issues.

According to exemplary embodiments, the ADFDM 406 may be configured to transmit build information for regions or environments. It may hold this information for a predetermined amount of time, during which period no other build gets triggered as long as the region is present in the cache. This cache may be added to avoid unnecessary builds.

According to exemplary embodiments, the ADFDM 406 may be configured to provide count representing how many times an environment got triggered for deployment by the ADFDM 406.

According to exemplary embodiments, the ADFDM 406 may be configured to provide WSDL URL (uniform resource locator) information for which the ADFDM 406 got triggered. It may be useful to generate stubs manually and check in to the version control system 518 (i.e., GIT repository).

Exemplary detailed functionalities of auto healing web service disruptions are described below referring to FIGS. 4-5.

According to exemplary embodiments, the communication module 414 may be configured to establish a communication link between a web service provider device in a web service provider side (i.e., SOAP provider side of the SOAP provider block 508) and a web service consuming device in a web service consuming side (i.e., SOAP client side of the SOAP client block 505) in a computer network environment.

According to exemplary embodiments, the receiving module 416 may be configured to receive a request from the web service consuming device to receive a web service provided by the web service provider device.

According to exemplary embodiments, the detecting module 418 (i.e., within the SOAP service monitor 506) may be configured to detect a change in an XML document in the web service provider side which disrupts receiving the web service requested by the web service consuming device.

According to exemplary embodiments, the generating module 420 (i.e., within the stubs generator 507) may be configured to generate stubs on the fly in response to detecting the change in the XML document.

According to exemplary embodiments, the implementing module 422 may be configured to implement the stubs that addresses the detected change in the XML document and the execution module 424 automatically heals web service disruptions in response to implementing the stubs.

According to exemplary embodiments, the web service provider device may utilize both the XML (Extensible Markup Language) document that describes the web service and a predefined messaging protocol specification that exchanges structured information in implementation of the web service in the computer network environment, but the disclosure is not limited thereto.

According to exemplary embodiments, the XML document may be a WSDL document that describes functions that can be implemented or exposed to the web service consuming device, but the disclosure is not limited thereto.

According to exemplary embodiments, the predefined messaging protocol may be a SOAP protocol which is an XML-based protocol configured for exchanging info over a particular protocol between applications, but the disclosure is not limited thereto.

According to exemplary embodiments, the particular protocol may include any one of the following protocol: IMAP (Internet Message Access Protocol), POP (Post Office Protocol 3) protocol; SMTP (Simple Mail Transfer Protocol), HTTP (Hyper Text Transfer Protocol), and FTP (File Transfer Protocol), but the disclosure is not limited thereto.

According to exemplary embodiments, in generating the stubs on the fly, the communication module 414 may be configured to transmit a notification to the SOAP service monitor 506 that a change in the WSDL is detected by the web service consuming device and in turn, invoke an auto build application programming interface (API) with WSDL which got changed, wherein the auto build API invokes the automation server 504 and triggers the build. The stubs generator than automatically generates the stubs in the automation server 504 (i.e., Jenkins) in response to triggering the build. The deploying module 426 then deploys the stubs onto the private cloud 514 as a packaged file format.

According to exemplary embodiments, the automation server 504 may be configured to facilitate automating the parts of software development related to building, testing, and deploying, facilitating continuous integration and continuous delivery, but the disclosure is not limited thereto.

According to exemplary embodiments, the automation server 504 may be Jenkins and the packaged file format may be a Java archive (JAR) file format. The JAR is a package file format typically used to aggregate many Java class files and associated metadata and resources into one file for distribution. JAR files are archive files that may include a Java-specific manifest file and typically have a .jar file extension.

Figure 6:
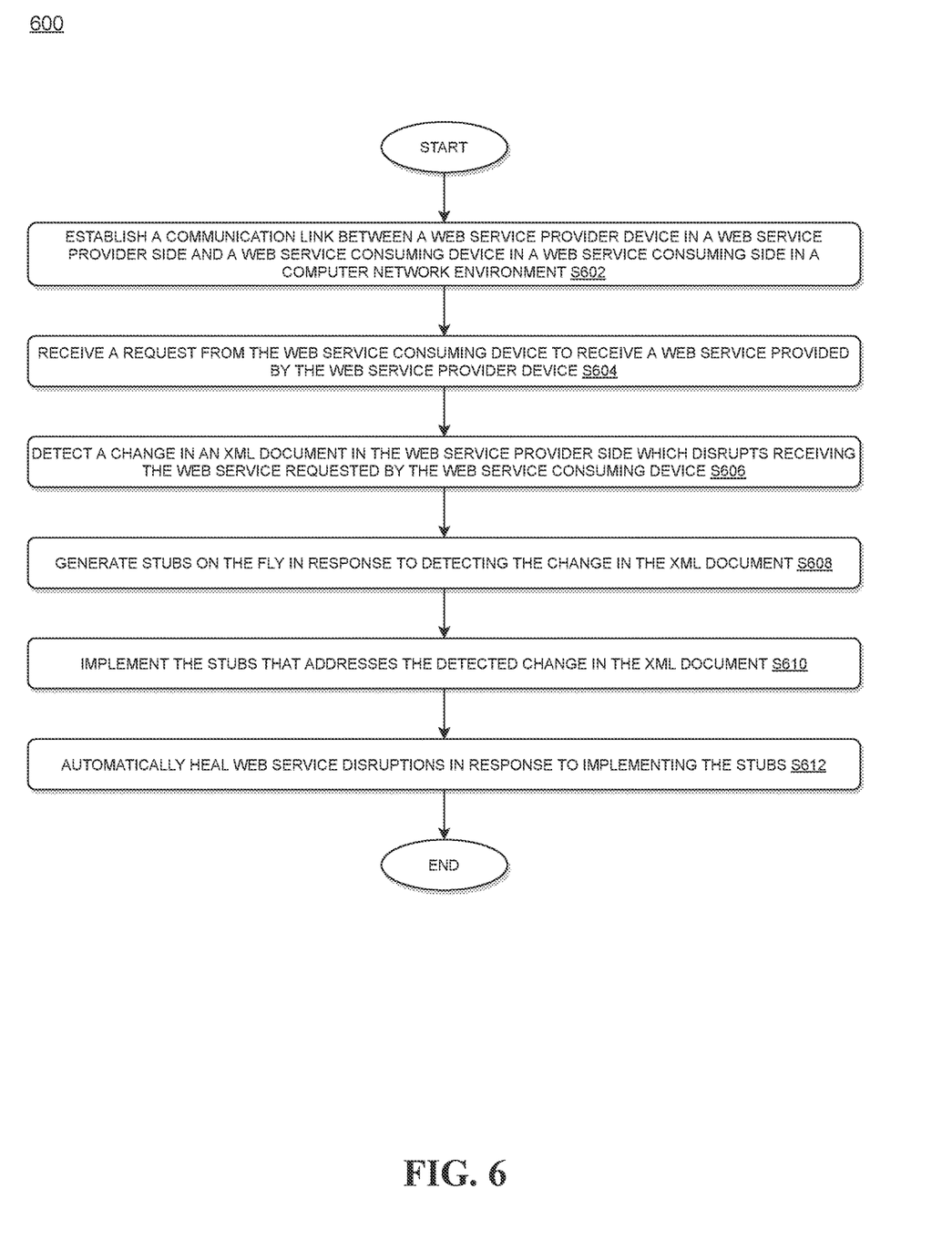
FIG. 6 illustrates a flow chart of implementing an auto detect, fix, and deploy module for automatically healing web service disruptions in accordance with an exemplary embodiment.

FIG. 6 illustrates a flow chart of a process 600 implemented by the ADFDM 406 of FIG. 4 for automatically healing web service disruptions in accordance with an exemplary embodiment. It will be appreciated that the illustrated process 600 and associated steps may be performed in a different order, with illustrated steps omitted, with additional steps added, or with a combination of reordered, combined, omitted, or additional steps.

As illustrated in FIG. 6, at step 602, the process 600 may include establishing a communication link between a web service provider device in a web service provider side and a web service consuming device in a web service consuming side in a computer network environment.

At step 604, the process 600 may include receiving a request from the web service consuming device to receive a web service provided by the web service provider device.

At step 606, the process 600 may include detecting a change in an XML document in the web service provider side which disrupts receiving the web service requested by the web service consuming device.

At step 608, the process 600 may include generating stubs on the fly in response to detecting the change in the XML document.

At step 610, the process 600 may include implementing the stubs that addresses the detected change in the XML document.

At step 612, the process 600 may include automatically healing web service disruptions in response to implementing the stubs.

According to exemplary embodiments, in generating the stubs on the fly, the process 600 may further include: transmitting a notification to a SOAP service monitor that a change in the WSDL is detected by the web service consuming device; invoking, in response to receiving the notification, an auto build application programming interface (API) with WSDL which got changed, wherein the auto build API invokes an automation server and triggers the build; automatically generating the stubs in the automation server in response to triggering the build; and deploying the stubs onto a private cloud as a packaged file format, but the disclosure is not limited thereto.

According to exemplary embodiments, the ADFDD 402 may include a memory (e.g., a memory 106 as illustrated in FIG. 1) which may be a non-transitory computer readable medium that may be configured to store instructions for implementing an ADFDM 406 for automatically healing web service disruptions as disclosed herein. The ADFDD 402 may also include a medium reader (e.g., a medium reader 112 as illustrated in FIG. 1) which may be configured to read any one or more sets of instructions, e.g., software, from any of the memories described herein. The instructions, when executed by a processor embedded within the ADFDM 406 or within the ADFDD 402, may be used to perform one or more of the methods and processes as described herein. In a particular embodiment, the instructions may reside completely, or at least partially, within the memory 106, the medium reader 112, and/or the processor 104 (see FIG. 1) during execution by the ADFDD 402.

According to exemplary embodiments, the instructions, when executed, may cause the processor 104 to perform the following: establishing a communication link between a web service provider device in a web service provider side and a web service consuming device in a web service consuming side in a computer network environment; receiving a request from the web service consuming device to receive a web service provided by the web service provider device; detecting a change in an XML document in the web service provider side which disrupts receiving the web service requested by the web service consuming device; generating stubs on the fly in response to detecting the change in the XML document; implementing the stubs that addresses the detected change in the XML document; and automatically healing web service disruptions in response to implementing the stubs.

According to exemplary embodiments, in generating the stubs on the fly, the instructions, when executed, may cause the processor 104 to further perform the following: transmitting a notification to a SOAP service monitor that a change in the WSDL is detected by the web service consuming device; invoking, in response to receiving the notification, an auto build application programming interface (API) with WSDL which got changed, wherein the auto build API invokes an automation server and triggers the build; automatically generating the stubs in the automation server in response to triggering the build; and deploying the stubs onto a private cloud as a packaged file format, but the disclosure is not limited thereto.

According to exemplary embodiments as disclosed above in FIGS. 1-6, technical improvements effected by the instant disclosure may include a platform for implementing an auto detect, fix, and deploy module that can heal issues with WSDL changes from consumer side automatically without any manual intervention, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for automatically healing web service disruptions by utilizing one or more processors and one or more memories, the method comprising:
    establishing a communication link between a web service provider device in a web service provider side and a web service consuming device in a web service consuming side in a computer network environment;
    receiving a request from the web service consuming device to receive a web service provided by the web service provider device;
    detecting a change in an XML document in the web service provider side which disrupts receiving the web service requested by the web service consuming device;
    generating stubs on the fly in response to detecting the change in the XML document;
    implementing the stubs that addresses the detected change in the XML document; and
    automatically healing web service disruptions in response to implementing the stubs.

2. The method according to claim 1, wherein the web service provider device utilizes both the XML (Extensible Markup Language) document that describes the web service and a predefined messaging protocol specification that exchanges structured information in implementation of the web service in the computer network environment.

3. The method according to claim 2, wherein the XML document is a WSDL (Web Services Description Language) document that describes functions that can be implemented or exposed to the web service consuming device.

4. The method according to claim 3, wherein the predefined messaging protocol is a SOAP (Simple Object Access Protocol) protocol which is an XML-based protocol configured for exchanging info over a particular protocol between applications.

5. The method according to claim 4, wherein said particular protocol includes any one of the following protocol: IMAP (Internet Message Access Protocol), POP (Post Office Protocol 3) protocol; SMTP (Simple Mail Transfer Protocol), HTTP (Hyper Text Transfer Protocol), and FTP (File Transfer Protocol).

6. The method according to claim 4, wherein, in generating the stubs on the fly, the method further comprising:
transmitting a notification to a SOAP service monitor that a change in the WSDL is detected by the web service consuming device;
invoking, in response to receiving the notification, an auto build application programming interface (API) with WSDL which got changed, wherein the auto build API invokes an automation server and triggers the build;
automatically generating the stubs in the automation server in response to triggering the build; and
deploying the stubs onto a private cloud as a packaged file format.

7. The method according to claim 6, wherein the automation server is Jenkins and the packaged file format is a Java archive (JAR) file format.

8. A system for automatically healing web service disruptions, the system comprising:
a processor; and
a memory operatively connected to the processor via a communication interface, the memory storing computer readable instructions, when executed, causes the processor to:
establish a communication link between a web service provider device in a web service provider side and a web service consuming device in a web service consuming side in a computer network environment;
receive a request from the web service consuming device to receive a web service provided by the web service provider device;
detect a change in an XML document in the web service provider side which disrupts receiving the web service requested by the web service consuming device;
generate stubs on the fly in response to detecting the change in the XML document;
implement the stubs that addresses the detected change in the XML document; and
automatically heal web service disruptions in response to implementing the stubs.

9. The system according to claim 8, wherein the web service provider device utilizes both the XML (Extensible Markup Language) document that describes the web service and a predefined messaging protocol specification that exchanges structured information in implementation of the web service in the computer network environment.

10. The system according to claim 9, wherein the XML document is a WSDL (Web Services Description Language) document that describes functions that can be implemented or exposed to the web service consuming device.

11. The system according to claim 10, wherein the predefined messaging protocol is a SOAP (Simple Object Access Protocol) protocol which is an XML-based protocol configured for exchanging info over a particular protocol between applications.

12. The system according to claim 11, wherein said particular protocol includes any one of the following protocol: IMAP (Internet Message Access Protocol), POP (Post Office Protocol 10) protocol; SMTP (Simple Mail Transfer Protocol), HTTP (Hyper Text Transfer Protocol), and FTP (File Transfer Protocol).

13. The system according to claim 11, wherein, in generating the stubs on the fly, the processor is further configured to:
transmit a notification to a SOAP service monitor that a change in the WSDL is detected by the web service consuming device;
invoke, in response to receiving the notification, an auto build application programming interface (API) with WSDL which got changed, wherein the auto build API invokes an automation server and triggers the build;
automatically generate the stubs in the automation server in response to triggering the build; and
deploy the stubs onto a private cloud as a packaged file format.

14. The system according to claim 13, wherein the automation server is Jenkins and the packaged file format is a Java archive (JAR) file format.

15. A non-transitory computer readable medium configured to store instructions for automatically healing web service disruptions wherein, when executed, the instructions cause a processor to perform the following:
establishing a communication link between a web service provider device in a web service provider side and a web service consuming device in a web service consuming side in a computer network environment;
receiving a request from the web service consuming device to receive a web service provided by the web service provider device;
detecting a change in an XML document in the web service provider side which disrupts receiving the web service requested by the web service consuming device;
generating stubs on the fly in response to detecting the change in the XML document;
implementing the stubs that addresses the detected change in the XML document; and
automatically healing web service disruptions in response to implementing the stubs.

16. The non-transitory computer readable medium according to claim 15, wherein the web service provider device utilizes both the XML (Extensible Markup Language) document that describes the web service and a predefined messaging protocol specification that exchanges structured information in implementation of the web service in the computer network environment.

17. The non-transitory computer readable medium according to claim 16, wherein the XML document is a WSDL (Web Services Description Language) document that describes functions that can be implemented or exposed to the web service consuming device.

18. The non-transitory computer readable medium according to claim 17, wherein the predefined messaging protocol is a SOAP (Simple Object Access Protocol) protocol which is an XML-based protocol configured for exchanging info over a particular protocol between applications.

19. The non-transitory computer readable medium according to claim 18, wherein said particular protocol includes any one of the following protocol: IMAP (Internet Message Access Protocol), POP (Post Office Protocol 3) protocol; SMTP (Simple Mail Transfer Protocol), HTTP (Hyper Text Transfer Protocol), and FTP (File Transfer Protocol).

20. The non-transitory computer readable medium according to claim 18, the instructions, when executed, cause the processor to further perform the following:
    transmitting a notification to a SOAP service monitor that a change in the WSDL is detected by the web service consuming device;
    invoking, in response to receiving the notification, an auto build application programming interface (API) with WSDL which got changed, wherein the auto build API invokes an automation server and triggers the build;
    automatically generating the stubs in the automation server in response to triggering the build; and
    deploying the stubs onto a private cloud as a packaged file format,
    wherein the automation server is Jenkins and the packaged file format is a Java archive (JAR) file format.

* * * * *